Oct. 15, 1968  R. D. TOMLIN  3,405,421
WINDSCREEN WIPERS
Filed Sept. 15, 1965
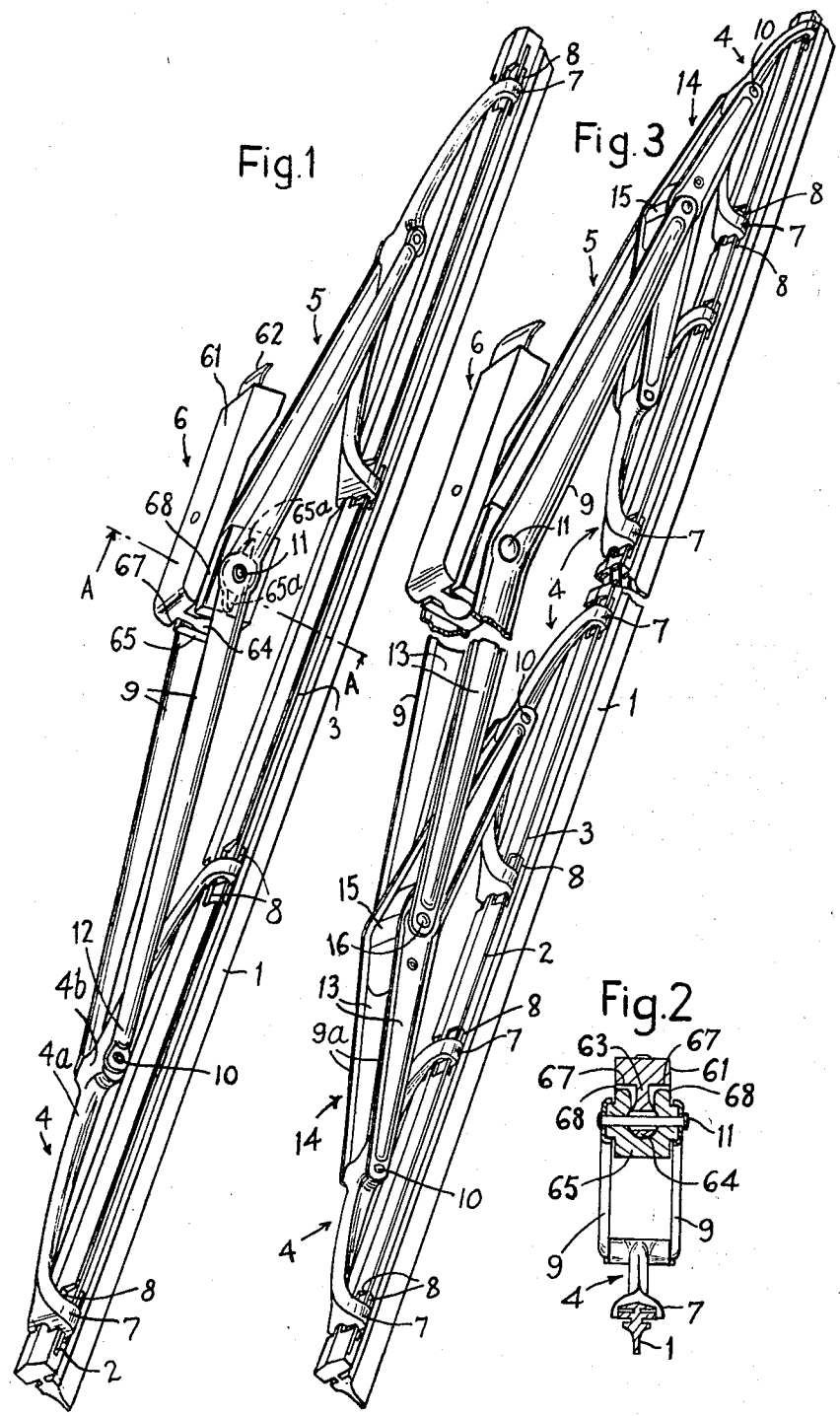

United States Patent Office 3,405,421
Patented Oct. 15, 1968

3,405,421
WINDSCREEN WIPERS
Robert Derrick Tomlin, Hampton Hill, England, assignor to Magnatex Limited, Harlington, Middlesex, England, a British company
Filed Sept. 15, 1965, Ser. No. 487,423
Claims priority, application Great Britain, Sept. 15, 1964, 37,711/64; Nov. 30, 1964, 48,634/64
8 Claims. (Cl. 15—250.42)

ABSTRACT OF THE DISCLOSURE

The present invention relates to windscreen wipers, particularly for wiping curved windscreens and, more particularly of the kind having a squeegee element provided with at least one flexible member which allows the element to flex to conform with the curvature of the windscreen but restrains transverse flexing thereof, said squeegee element being mounted in a pressure distributing superstructure comprising at least one yoke. In accordance with the invention, this at least one yoke is constituted by one or more substantially rigid strips arranged edgewise to the back of the squeegee and perpendicular to the windscreen. This construction prevents lifting of the squeegee element from the screen under wind pressures acting on the blade and coupled with the back pressure created between the screen and the yoke of the superstructure, specifically when the vehicle to which the windscreen wiper is attached is travelling at high speeds, thus creating such high wind pressures.

---

The present invention relates to windscreen wipers, and more particularly to windscreen wipers for wiping curved windscreens.

With increasing vehicle speeds, difficulty is experienced in keeping the squeegee element in contact with the windscreen as it reciprocates thereacross. The high wind pressures acting on the blade, coupled with the back pressure created between the screen and the conventional channel-shaped yokes of the pressure distributing superstructure of the wiper tends to lift the squeegee element from the screen. Some improvement is obtained by providing air escape holes in the squeegee element and the yoke members. Another construction employs resilient wires for forming the yoke members.

According to this invention, a windscreen wiper having a squeegee element provided with one or more flexible members which allow the squeegee element to flex to conform with the curvature of the windscreen but restrain transverse flexing thereof, is mounted in a pressure distributing superstructure of which at least one of the yokes is constituted by one or more strips of metal or other appropriate material arranged edgewise to the back of the squeegee, that is with the major surfaces thereof substantially perpendicular to the surface of the windscreen. Preferably such yoke comprises two strips of metal, arranged side-by-side and spaced apart.

With a yoke constructed according to this invention, air, when the car is travelling at speed, can impinge directly on the back of the squeege element, the air pressure tending to hold the squeegee element against the windscreen. Where the yoke comprises a pair of spaced strips, the distance therebetween is conveniently about the same as or slightly greater than the width across the back of the squeegee element. The oncoming air is guided between the strips towards the back of the squeegee element, and air forced by the back pressure away from the screen and between the yoke strips reacts against the oncoming air. This reaction does not tend to lift the pressure distributing superstructure, but, on the other hand, tends to maintain a pressure of air against the back of the squeegee element to maintain it in contact with the windscreen.

The strips may be formed with a suitable cross-section, for example with longitudinal embossments or depressions, in order to increase the strength of the strips against transverse flexing.

Only the primary yoke or bridge piece may be constructed as above described. Conveniently the secondary yokes may be formed, e.g. by casting or moulding, of a suitable material, e.g. metal or plastics, with a mainly rounded or streamlined cross-section. Conveniently the secondary yokes are moulded of a thermoplastic material, such as nylon, with claws or fingers at their ends which embrace the flexible metal strip or strips of the squeegee element.

In order that the invention may be more clearly understood, reference will now be made to the accompanying drawings, in which:

FIGURE 1 is a perspective view of one embodiment of the invention,

FIGURE 2 is a section on the line A—A in FIGURE 1,

FIGURE 3 is a perspective view of another embodiment.

Referring to FIGURES 1 and 2, the windscreen wiper shown comprises a squeegee element 1 having flexible strips 2 arranged in grooves 3 along opposite sides thereof in the manner generally described in British specification No. 930,097, the squeegee element being mounted in a pressure distributing holder comprising secondary yokes 4 and a primary yoke or bridge piece 5 provided with a connector 6 for attaching the wiper to a wiper arm.

The secondary yokes 4 are moulded of a thermoplastic material, such as nylon, with fingers 7 at their ends which embrace the edges of the flexible strips 2 as shown, for which purpose portions of the flanges defining the grooves 3 may be removed as shown at 8. The arm portion 4a of the yokes are made of rounded or streamlined cross-section.

The bridge piece 5 is constructed of two strips of metal 9 shaped as shown and disposed edgewise to the back of the squeegee element, the strips being spaced apart and having their ends pivotally connected to opposite sides of boss portions 4b at or adjacent the centres of the primary yokes 4 respectively by means of rivets 10. The strips are spaced apart at the centre of the bridge piece by a spacer member 65, which may be of plastic material and is pivoted to the yoke by a rivet 11, the member 65 also serving to carry the connector as later described.

The bridge-piece strips may be strengthened against transverse flexing, for example by being embossed to a curved cross-section 12. The strips are spaced apart by a distance slightly greater than the width across the back of the squeegee element. To reduce the effect of wind pressure on the sides of the squeegee element, the latter should be kept as shallow as possible while maintaining the desired flexing and wiping efficiency of the wiping edge.

While the connector 6 may be so constructed and pivoted to the bridge piece 5 of the pressure distributing superstructure as to hold the latter substantially upright on the surface of the screen so that the wiping edge of the squeegee element moves to its trailing position as it reciprocates back and forth across the screen substantially entirely by flexing of the squeegee element, it has been found that, owing to the heavy arm pressure which has to be applied to the back of the wiper, the wiping edge of the squeegee element may sometimes fail to flex over to a trailing position as the wiper reciprocates. This may occur if the wiping edge has taken a "set" to one side by reason of remaining in the parking position for some length of time without being used, or if the squeegee element is made of shallow depth to reduce wind pressure thereon. To obviate this, the wiper arm connector preferably has a limited transverse rocking movement relative to the bridge-piece so as to allow the pressure distributing superstructure to rock over slightly when the wiper reverses its direction of movement so as to assist the flexing over of the wiping edge of the squeegee element to the trailing position.

In the embodiment shown in FIGURES 1 and 2, the connector 6 is moulded of a synthetic plastics material with an inverted channel portion 61 which is open at its end to receive the wiper arm (not shown) and provided with a leaf spring 62 for retaining the wiper arm in the connector in known manner. The underside of the other end of the connector is formed with a web 63 having a generally cylindrical enlargement 64 along its edge, which enlargement is designed to fit in a correspondingly shaped channel in the U-shaped member 65 designed to fit between the inner surfaces of the metal strips 9 constituting the bridge piece 5. A rivet 11 extends between the strips 9 and passes through holes in the member 65 and the web 63 of the connector to hold the parts assembled while allowing the member 65, with the connector therein, to pivot about the rivet 11.

The depth of the web 63 is such that the undersurface 67 of the connector at opposite sides of the web, will be spaced by a small distance from the upper edges 68 of the member 65 when the wiper is in the upright position shown in FIGURE 2. The hole in the web 63 through which the rivet 11 passes provides sufficient clearance to allow the member 65 and the blade assembly to rock slightly about the cylindrical enlargement 64 to a trailing position to one side or the other of the plane perpendicular to the screen, the amount of rocking movement being limited by one or other of the edges 68 of the member 65 abutting the surface 67 of the connector.

As both the member 65 and the connector are made of a plastics material, such as nylon, noise between these parts is negligible. The member 65 may have projections 65a at opposite sides which engage in the curved form of the strips 9 to limit the extent to which the connector can turn about the rivet 11.

FIGURE 3 shows a modification for a larger wiper comprising four secondary yokes 4, two secondary yokes 14, and a primary yoke or bridge-piece 5 of which the ends are pivoted to the secondary yokes 14 adjacent the centres thereof. The secondary yokes 14 and bridge-piece 5 are constructed of spaced metal strips 9a and 9 similar to those described for the bridge-piece of the embodiment of FIGURE 1, except that the strips are made somewhat wider and have strengthening embossments 13 along their central regions. The metal strips 9a of a secondary yoke 14 are spaced at their centres by a spacer 15, which may be made of plastic, the ends of the bridge-piece being pivoted thereto by a rivet 16.

As the fingers at the ends of the secondary yokes are of plastic material substantially no noise is produced at these connections to the flexible strips 2, and moreover they are less likely than metal to scratch the windscreen if they should come into contact therewith as the wiper blade reciprocates across the screen. However, if desired, the lower flanges of the grooves need not be entirely removed where the fingers engage the flexible strips, so that these flanges (which may have recesses formed in their groove-facing surfaces to accommodate the fingers) overlie the undersides of the fingers and prevent them from coming into contact with the surface of the screen.

While particular embodiments have been described, it will be understood that various modifications may be made without departing from the scope of the invention. For example, the two strips forming a yoke primary or bridge-piece can be integral, being stamped or cut from sheet material and folded to the required configuration. They could also be cast or moulded from metal or plastics of appropriate strength. The strips may be shaped or assembled, for example so that the space therebetween diverges or converges in the direction towards the back of the squeegee element, to control the flow of air therebetween, and/or to regulate the resultant of the thrust of air pressure on the external surfaces of the strips. For example, the strips may be embossed so that the inner surfaces converge towards the squeegee element and then diverge, the shoulders thereby formed on the outsides of the strips forming surfaces against which the pressure of a cross wind can act to urge the yoke towards the windscreen.

Although it is preferred to make the secondary yokes 4 of plastic mouldings as above described, it will be understood that they can also be constructed of one or more strips, arranged, edgewise to the surface of the windscreen as above described.

I claim:

1. A windscreen wiper having a squeegee element provided with at least one flexible member which allows the squeegee element to flex to conform with the curvature of the windscreen but restrains transverse flexing thereof, said squeegee element being mounted in a pressure distributing superstructure comprising at least one yoke, wherein said yoke is constituted by at least one substantially rigid strip arranged edgewise to the back of the squeegee and perpendicular to the windscreen.

2. A windscreen wiper as claimed in claim 1, wherein said yoke is constituted by two strips, arranged side-by-side and spaced apart by a distance approximately the same as the width across the back of the squeegee element.

3. A windscreen wiper as claimed in claim 2, wherein said yoke is provided with a connector for connecting the wiper to a wiper arm, and means pivoting said connector to the strips for pivoting movement about an axis transverse to the longitudinal axis of the wiper.

4. A windscreen wiper as claimed in claim 3, wherein the connector is formed on its underside with a web which extends in the longitudinal direction of the wiper and has a generally cylindrical enlargement along its bottom edge, which enlargement fits in a correspondingly shaped channel in a U-shaped member arranged between and pivoted to the strips, the arrangement being such that the connector can rock to a limited extent, relative to said U-shaped member, about the axis of said enlargement.

5. A windscreen wiper as claimed in claim 2, wherein the strips are reinforced against transverse bending by embossments extending therealong.

6. A windscreen wiper as claimed in claim 4, wherein the U-shaped member is provided with a projection which engages with an embossment for limiting the extent to which said U-shaped member can pivot relative to the strips and said strips are reinforced against transverse bending by embossments extending therealong.

7. A windscreen wiper as claimed in claim 3, wherein the ends of said two strips constituting said yoke are pivoted to two secondary yokes respectively, said secondary yokes each being made of a plastics material and having their ends connecting with said at least one flexible member.

8. A windscreen wiper as claimed in claim 7, comprising two flexible members of strip-like form arranged in grooves along opposite sides of the squeegee element respectively, the ends of said secondary yokes being formed with fingers, which embrace the outer edges of the flexible members.

References Cited

UNITED STATES PATENTS 2,916,760    12/1959    Anderson _____ 15—250.33
2,937,393    5/1960    Brueder _____ 15—250.42

FOREIGN PATENTS 1,262,991    4/1961    France.
940,214    10/1963    Great Britain.

CHARLES A. WILLMUTH, *Primary Examiner.*